(12) United States Patent
Ogihara (10) Patent No.: US 11,478,973 B2
(45) Date of Patent: Oct. 25, 2022

(54) METHOD FOR MANUFACTURING RESIN CONTAINER, AND DEVICE FOR MANUFACTURING RESIN CONTAINER

(71) Applicant: NISSEI ASB MACHINE CO., LTD., Nagano (JP)

(72) Inventor: Shuichi Ogihara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 17/271,296

(22) PCT Filed: Aug. 27, 2019

(86) PCT No.: PCT/JP2019/033558
§ 371 (c)(1),
(2) Date: Feb. 25, 2021

(87) PCT Pub. No.: WO2020/045451
PCT Pub. Date: Mar. 5, 2020

(65) Prior Publication Data
US 2021/0339452 A1 Nov. 4, 2021

(30) Foreign Application Priority Data

Aug. 28, 2018 (JP) .............................. JP2018-158912

(51) Int. Cl.
*B29C 49/06* (2006.01)
*B29C 49/42* (2006.01)
(Continued)

(52) U.S. Cl.
CPC .......... *B29C 49/06* (2013.01); *B29C 49/4205* (2013.01); *B29C 49/6427* (2013.01);
(Continued)

(58) Field of Classification Search
CPC . B29C 49/4205; B29C 49/28; B29C 49/6427; B29C 49/6409; B29C 49/68
See application file for complete search history.

(56) References Cited

U.S. PATENT DOCUMENTS 4,151,249 A * 4/1979 Lee ..................... B29C 49/6436
215/382
5,290,506 A 3/1994 Yokobayashi
(Continued)

FOREIGN PATENT DOCUMENTS

| JP | 5-131528 A | 5/1993 |
| JP | 5-92240 U | 12/1993 |

(Continued)

OTHER PUBLICATIONS

Machine translation of JP 11-42698 A dated Feb. 1999 obtained from the Google Patents website. (Year: 1999).*
(Continued)

*Primary Examiner* — Robert B Davis
(74) *Attorney, Agent, or Firm* — Greenblum & Bernstein, P.L.C.

(57) ABSTRACT

This method for manufacturing a resin container includes injection molding a plurality of preforms in an arrangement direction, a adjusting the temperature of the preforms, and molding containers from the preforms. The manufacturing method includes, between the injection molding and the temperature adjusting, changing the orientation of the preforms aligned in the arrangement direction to an orientation aligned in a conveying direction.

10 Claims, 6 Drawing Sheets

(51) Int. Cl.
  *B29C 49/64* (2006.01)
  *B29K 67/00* (2006.01)
  *B29L 31/00* (2006.01)
(52) U.S. Cl.
  CPC ... *B29C 49/42119* (2022.05); *B29K 2067/003* (2013.01); *B29L 2031/7158* (2013.01)

(56) References Cited

U.S. PATENT DOCUMENTS

| | | | |
|---|---|---|---|
| 5,744,176 | A | 4/1998 | Takada et al. |
| 5,753,279 | A | 5/1998 | Takada et al. |
| 5,869,110 | A | 2/1999 | Ogihara |
| 5,902,612 | A * | 5/1999 | Ogihara ............. B29C 49/4205 425/534 |
| 5,972,255 | A | 10/1999 | Takada et al. |
| 6,019,933 | A | 2/2000 | Takada et al. |
| 6,109,907 | A | 8/2000 | Takada et al. |
| 6,156,258 | A | 12/2000 | Takada et al. |
| 6,247,916 | B1 | 6/2001 | Takada et al. |
| 2001/0031291 | A1 | 10/2001 | Takada et al. |
| 2004/0035680 | A1 | 2/2004 | Mergy et al. |
| 2005/0194709 | A1* | 9/2005 | Dunman ............. B29C 45/7207 264/348 |
| 2013/0236589 | A1 | 9/2013 | Yamaguchi et al. |
| 2018/0029280 | A1 | 2/2018 | Morikami |

FOREIGN PATENT DOCUMENTS

| | | |
|---|---|---|
| JP | 6-285965 | 10/1994 |
| JP | 8-132517 A | 5/1996 |
| JP | 11-34152 A | 2/1999 |
| JP | 11-042698 A | 2/1999 |
| JP | 2004-513046 A | 4/2004 |
| JP | 2015-048243 A | 3/2015 |

OTHER PUBLICATIONS

International Search Report issued in International Patent Application No. PCT/JP2019/033558, dated Oct. 29, 2019, along with an English translation thereof.
Written Opinion of the International Searching Authority issued in International Application No. PCT/JP2019/033558, dated Oct. 29, 2019, along with an English translation thereof.
Office Action issued in Taiwanese Patent Application No. 108130753, dated Jan. 12, 2021, along with an English translation thereof.
Extended European Search Report Issued in Corresponding EP Patent Application No. 19855884.3, dated May 2, 2022.
Office Action Issued in Corresponding CN Patent Application No. 201980065265.0, dated May 9, 2022, along with an English translation thereof.

* cited by examiner

METHOD FOR MANUFACTURING RESIN CONTAINER, AND DEVICE FOR MANUFACTURING RESIN CONTAINER

TECHNICAL FIELD

The present invention relates to a method for manufacturing a resin container and a device for manufacturing a resin container.

BACKGROUND ART

In PTL 1, a hot parison type blow molding device and a method of manufacturing a resin container using the same are described. In PTL 2, a large-sized container is described, which is obtained by injection-molding a polyester resin into a bottomed cylindrical preform, adjusting a temperature of the preform and then blow-molding the preform.

CITATION LIST

Patent Literature

PTL 1: JP H08-132517 A
PTL 2: JP H11-034152 A

SUMMARY OF INVENTION

Technical Problem

In manufacturing a resin container, there are market needs for improvement in hot parison type (1 step type to 1.5 step type) blow molding using heat retained during injection molding of a preform. Examples of the market needs include enhancing an amount of production of containers per unit time, maintaining or improving a quality of the containers even under a short cycle time, being capable of coping with molding of special containers and the like.

An object of the present invention is to provide a method for manufacturing a resin container and a device for manufacturing a resin container, in which it is possible to maintain or improve a quality of resin containers even under a short cycle time while enhancing an amount of production of the containers per unit time.

Solution to Problem

In order to solve the above object, a method for manufacturing a resin container according to one aspect of the present includes:

an injection molding step of injection-molding a plurality of preforms along a predetermined arrangement direction;

a temperature adjustment step of adjusting a temperature of the preforms;

a blow molding step of molding resin containers from the preforms;

after the injection molding step, conveying the preforms and the containers through the temperature adjustment step and the blow molding step along a conveying direction intersecting the arrangement direction; and between the injection molding step and the temperature adjustment step, a changing step of changing an orientation of the preforms aligned in the arrangement direction to an orientation aligned along the conveying direction.

Preferably, in the manufacturing method for the resin container as described above, the changing step includes:

receiving the preforms injection-molded in the injection molding step by a holding member positioned at a receiving position where the holding member receives the preforms;

moving the holding member from the receiving position to a delivering position where the preforms are to be delivered to the temperature adjustment step;

while moving the holding member, rotating the holding member about an axis of the holding member to change the orientation of the preforms aligned in the arrangement direction to the orientation aligned along the conveying direction; and delivering the preforms from the delivering position to the temperature adjustment step.

Preferably, in the manufacturing method for the resin container as described above, a preform positioned at one end of the preforms along the arrangement direction in the injection molding step is defined as a first preform and a preform positioned at the other end of the preforms along the arrangement direction in the injection molding step is defined as a N1th preform, N1 being an integer of 2 or more, and the changing step includes changing the orientation of the preforms aligned in the arrangement direction to the orientation aligned along the conveying direction in such a way that the first preform is at a forefront.

Preferably, in the manufacturing method for the resin container as described above, the injection molding step includes an injection step of injecting a molten resin into cavities to mold the preforms, and a post-cooling step of cooling the preforms released from the cavities after molded in the injection step.

Preferably, in the manufacturing method for the resin container as described above, the changing step includes allowing the preforms to be cooled in an air.

Preferably, in the manufacturing method for the resin container as described above, the temperature adjustment step includes: a normal temperature adjustment step of adjusting a temperature of the preforms; and a local temperature adjustment step of locally adjusting the temperature of the preforms.

In order to solve the above object, a device for manufacturing a resin container according to one aspect of the present includes:

an injection molding station configured to injection-mold a plurality of preforms along a predetermined arrangement direction;

a temperature adjustment station configured to adjust a temperature of the preforms;

a blow molding station configured to mold resin containers from the preforms;

a conveying mechanism configured to convey the preforms and the containers through the temperature adjustment station and the blow molding station along a conveying direction intersecting the arrangement direction; and a changing mechanism provided between the injection molding station and the temperature adjustment station, the changing mechanism being configured to change an orientation of the preforms aligned in the arrangement direction to an orientation aligned along the conveying direction.

Preferably, in the device for manufacturing the resin container as described above, the changing mechanism includes:

a holding member configured to hold the preforms;

a moving mechanism configured to move the holding member from a receiving position where the holding member receives the preforms injection-molded in the injection molding station to a delivering position where the preforms are to be delivered to the temperature adjustment station; and a holding member switching mechanism configured to rotate the holding member about an axis of the holding member to change the orientation of the preforms aligned in the arrangement direction to the orientation aligned along the conveying direction, while moving the holding member.

Preferably, in the device for manufacturing the resin container as described above, a preform positioned at one end of the preforms along the arrangement direction in the injection molding station is defined as a first preform and a preform positioned at the other end of the preforms along the arrangement direction in the injection molding station is defined as a N1th preform, N1 being an integer of 2 or more, and the changing mechanism is configured to change the orientation of the preforms aligned in the arrangement direction to the orientation aligned along the conveying direction in such a way that the first preform is at a forefront.

Preferably, in the device for manufacturing the resin container as described above, the injection molding station includes: an injection unit configured to inject a molten resin into cavities to mold the preforms; and a post-cooling unit configured to cool the preforms released from the cavities after molded in the injection unit.

Preferably, in the device for manufacturing the resin container as described above, the device includes a cooling unit provided between the injection molding station and the temperature adjustment station and configured to allow the preforms to be cooled in an air, the changing mechanism is provided in the cooling unit.

Preferably, in the device for manufacturing the resin container as described above, the temperature adjustment station includes: a normal temperature adjustment unit configured to adjust a temperature of the preforms; and a local temperature adjustment unit configured to locally adjust the temperature of the preforms.

In order to solve the above object, a method for manufacturing a resin container according to another aspect of the present invention includes:

an injection molding step of injection-molding a plurality of preforms along a predetermined arrangement direction;

a temperature adjustment step of adjusting a temperature of the preforms;

a blow molding step of molding resin containers from the preforms; and after the injection molding step, conveying the preforms and the containers through the temperature adjustment step and the blow molding step along a conveying direction intersecting the arrangement direction, and the injection molding step includes: an injection step of injecting a molten resin into cavities to mold the preforms; and a post-cooling step of cooling the preforms released from the cavities after molded in the injection step.

In order to solve the above object, a device for manufacturing a resin container according to another aspect of the present invention includes:

an injection molding station configured to injection-mold a plurality of preforms along a predetermined arrangement direction;

a temperature adjustment station configured to adjust a temperature of the preforms;

a blow molding station configured to mold resin containers from the preforms; and a conveying mechanism configured to convey the preforms and the containers through the temperature adjustment station and the blow molding station along a conveying direction intersecting the arrangement direction, and the injection molding station includes: an injection unit configured to inject a molten resin into cavities to mold the preforms; and a post-cooling unit configured to cool the preforms released from the cavities after molded in the injection unit.

Advantageous Effects of Invention

According to the present invention, a method for manufacturing a resin container and a device for manufacturing a resin container, in which it is possible to maintain or improve a quality of resin containers even under a short cycle time while enhancing an amount of production of the containers per unit time, can be provided.

DESCRIPTION OF EMBODIMENTS

Hereinafter, embodiments of the present invention will be described with reference to the accompanying drawings. Meanwhile, it should be noted that dimensions of members shown in the figures may be differ from actual dimensions of the members for convenience of explanation.

Figure 1:
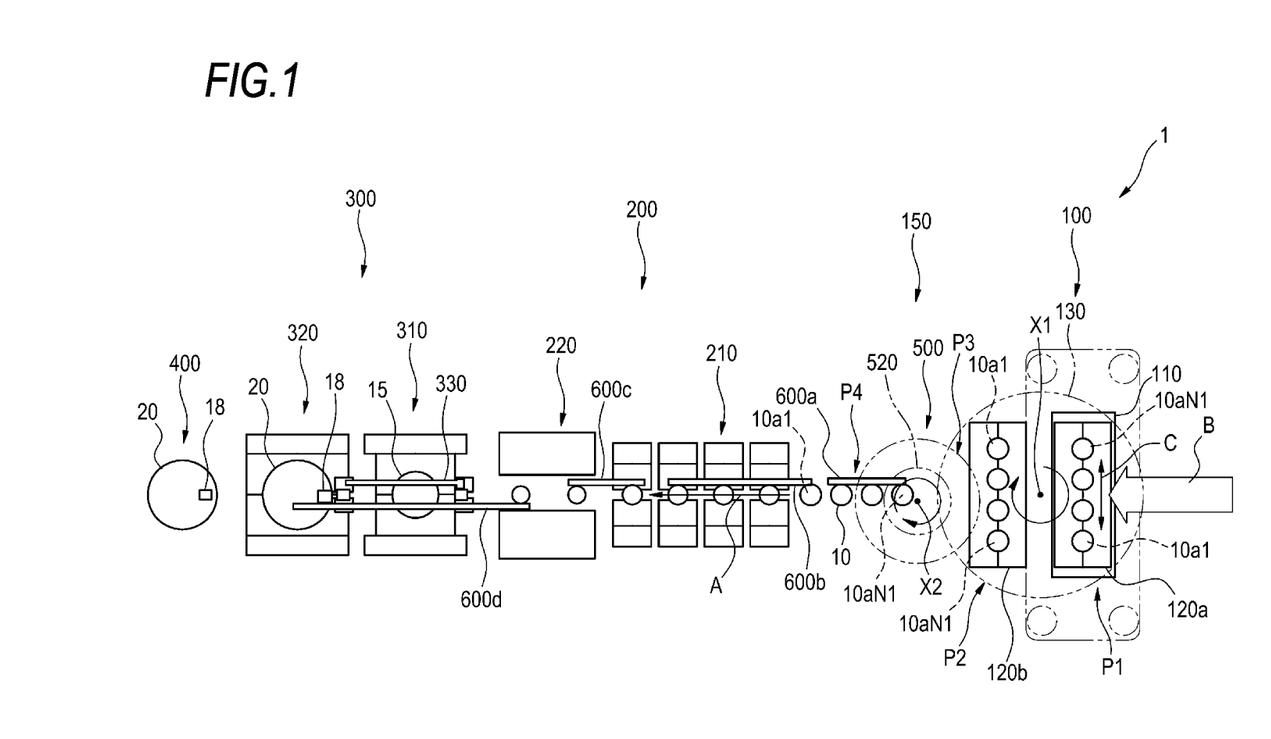
FIG. 1 is a schematic plan view showing a device for manufacturing a resin container according to an embodiment.
Figure 2:
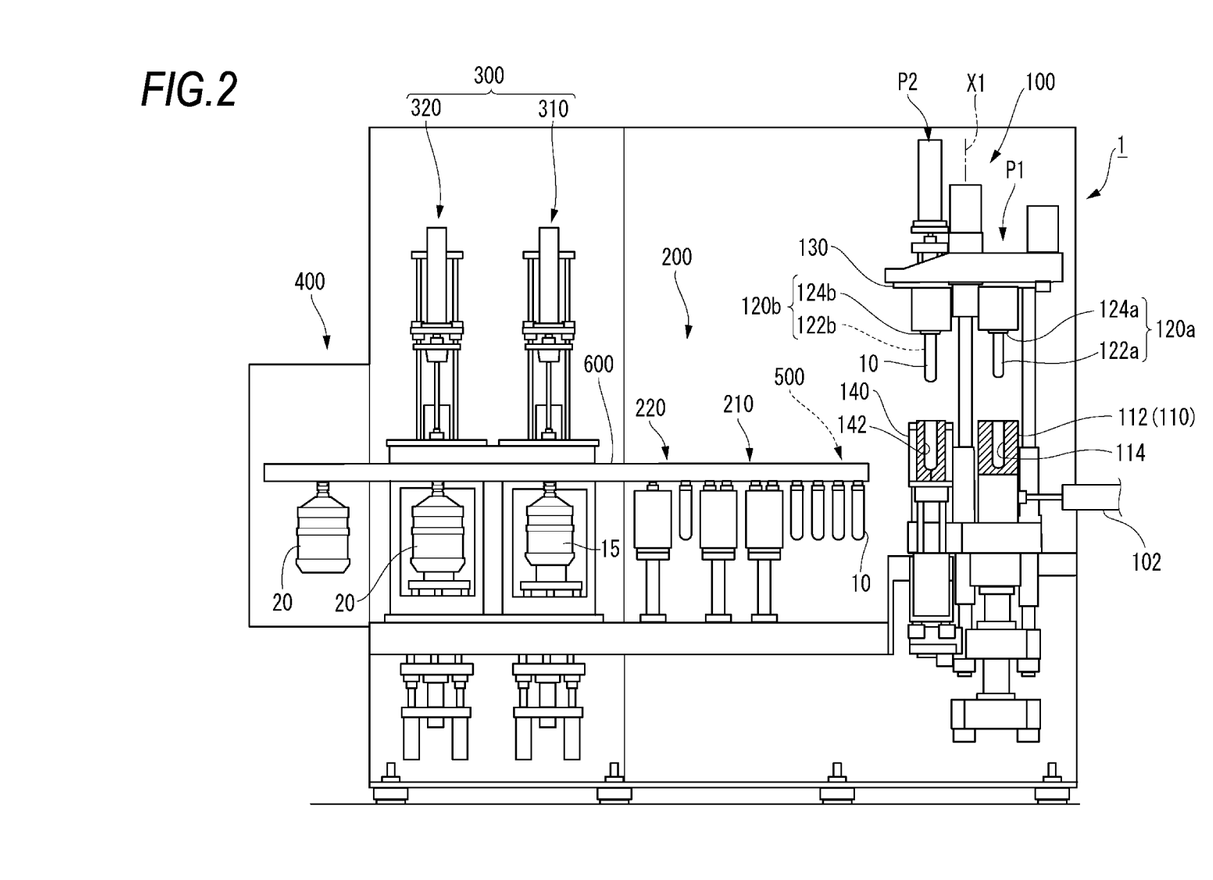
FIG. 2 is a schematic side view showing the device for manufacturing a resin container according to the embodiment.

FIG. 1 is a schematic plan view showing a device 1 for manufacturing a resin container according to the present embodiment. FIG. 2 is a schematic side view showing the device 1 for manufacturing a resin container according to the present embodiment. The manufacturing device 1 is a so-called four-station type molding device including an injection molding station 100 configured to injection-mold a plurality of preforms 10 along a predetermined arrangement direction, a temperature adjustment station 200 configured to adjust a temperature of the preforms 10, a blow molding station 300 configured to blow-mold a resin container 20 from the preforms 10; and a take-out station 400 configured to take out the shaped container 20. The container 20 manufactured by the manufacturing device 1 may be a large bottle, such as a 5-gallon bottle. In this example, the injection molding station 100, the temperature adjustment station 200, the blow molding station 300 and the take-out station 400 are arranged linearly with each other. Also, the manufacturing device 1 includes a changing unit (transfer unit) 150 provided between the injection molding station 100 and the temperature adjustment station 200. The changing unit 150 includes a transfer member 500 configured as a changing mechanism (not shown in FIG. 2).

A plurality of conveying members 600 (600a, 600b, 600c, 600d) each configured as a conveying mechanism (e.g., a parallel moving chuck (hand)) are provided through the changing unit 150, the temperature adjustment station 200, the blow molding station 300 and the take-out station 400. The plurality of conveying members 600 are configured to intermittently convey at least one of the preforms 10 and containers 20 per stroke along a conveying path A, which is a conveying direction extending linearly from the transfer member 500 to the take-out station 400.

The injection molding station 100 is configured to injection-mold a plurality of preforms 10 such that the plurality of preforms 10 are aligned along an arrangement direction C. The injection molding station 100 includes at least one first injection mold 110 and at least two second injection molds 120a, 120b. The first injection mold 110 includes an injection cavity mold 112 having a plurality of (e.g., four) concave portions 114 each configured to define an outer shape of a body portion of the preforms. The first injection mold 110 is connected to an injection device 102 that injects a resin material (e.g., polyester such as polyethylene terephthalate, polycarbonate and the like), which is a raw material for the preforms 10. The plurality of concave portions 114 of the injection cavity mold 112 are linearly aligned along the arrangement direction C orthogonal to an injection direction B of the injection device 102. Also, the arrangement direction C intersects (orthogonally) the conveying path A. Further, the injection device 102 is connected to the center portion of the first injection mold 110 as viewed in the arrangement direction C. A coolant is supplied to the first injection mold 110 and the second injection mold 120a (120b) of the injection molding station 100. A temperature of the coolant is set to 5 to 20° C., for example.

Figure 3:
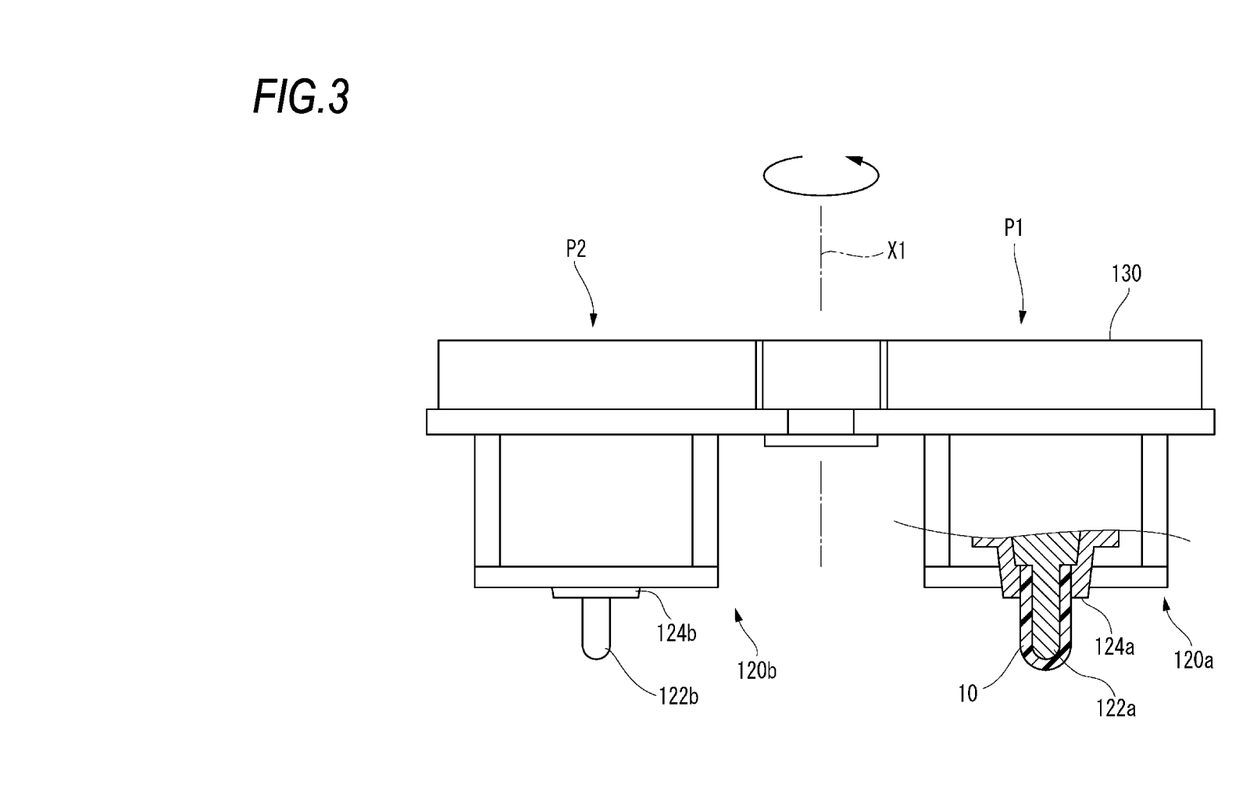
FIG. 3 is a view showing a second injection mold.

Here, the second injection molds 120a, 120b will be described with reference to FIG. 3. Each of the second injection molds 120a, 120b includes a plurality of (e.g., four) injection core molds 122a, 122b and a plurality of injection neck molds 124a, 124b that are arranged along the arrangement direction C. The injection core molds 122a, 122b are configured to define inner shapes of the neck portion and the body portion of the preforms, and the injection neck molds 124a, 124b are configured to define an outer shape of the neck portion. The second injection molds 120a, 120b are connected to a first rotary member 130 that is a rotary table, and positioned on a circumference about a first central axis X1. The second injection molds 120a, 120b are intermittently rotatable about the first central axis X1. Specifically, the second injection molds 120a, 120b are disposed at positions revolved by 180° from each other about the first central axis X1. The first rotary member 130 is configured to intermittently rotate by 180° per one cycle of injection molding, thereby changing the positions of the second injection molds 120a, 120b with each other.

Returning to FIGS. 1 and 2, the injection molding station 100 will be described. In FIG. 1, the second injection mold 120a is disposed at a position (injection position P1) at which the first injection mold 110 is disposed, and the second injection mold 120b is disposed at a position (post-cooling position P2) which is opposite to the injection position P1 and thus revolved from the injection position P1 by 180° about the first central axis X1. The post-cooling position P2 is a position where preforms 10 injection-molded at the injection position P1 are being cooled while being retained by the injection core molds 122a, 122b and the injection neck molds 124a, 124b. The second injection molds 120a, 120b are configured to be movable between the injection position P1 and the post-cooling position P2, thereby changing positions thereof with each other. At the post-cooling position P2, a cooling pod 140 capable of receiving the preforms 10 and also moving up and down is provided (see FIG. 2). The cooling pod 140 has cavities 142 for receiving the respective preforms 10 therein and is provided with a flow path for a coolant, such as water, around the cavities 142. Although the cooling pod 140 is a member capable of cooling the preforms 10 from the outside, the present invention is not particularly limited thereto. The number of cavities 142 in the cooling pod 140 is the same as the number of concave portion 144 in the injection cavity mold 112. The cooling pod 140 is set to, for example, a temperature of 5 to 60° C., preferably 5 to 20° C.

In other words, the injection molding station 100 includes an injection unit disposed at the injection position P1 and a post-cooling unit disposed at the post-cooling position P2. The injection unit is configured to inject a molten resin into the cavities to mold preforms 10. The post-cooling unit is configured to cool the preforms 10 released from the cavities after molded in the injection unit.

Next, the transfer member 500 included in the changing unit 150 will be described with reference to FIG. 4. The transfer member 500 is a member configured to align the preforms 10, which have been molded by the injection molding station 100 and then aligned in the arrangement direction C, along the conveying path A and then to transfer the preforms 10 from the injection molding station 100 to the temperature adjustment station 200. The transfer member 500 includes two holding members 510a, 510b (e.g., hand members or chuck members) configured to hold the preforms 10. The holding members 510a, 510b includes a plurality of (e.g., four) holding portions 512 that grips and holds the neck portion 12 of the preforms 10. The number of holding portions 512 is the same as the number of concave portions 144 of the injection cavity mold 112 and the number of cavities 142 of the cooling pod 140. The respective holding members 510a, 510b are connected to respective end portions 520a, 520b of a second rotary member 520 that is configured to be intermittently rotated about a second central axis X2 by one first holding member switching mechanism (e.g., electric motor 530). In other words, the holding members 510a, 510b are positioned on a circumference about the second central axis X2. Specifically, the holding members 510a, 510b are disposed at positions revolved by 180° from each other about the second central axis X2. The second rotary member 520 is configured to intermittently rotate by 180° per one cycle of transferring, thereby changing the positions of the holding members 510a, 510b with each other. In addition, the holding portions 512 may be slidable in a horizontal direction with respect to the holding member 510a (510b), and the holding member 510a (510b) may be movable up and down with respect to the second rotary member 520.

Figure 4:
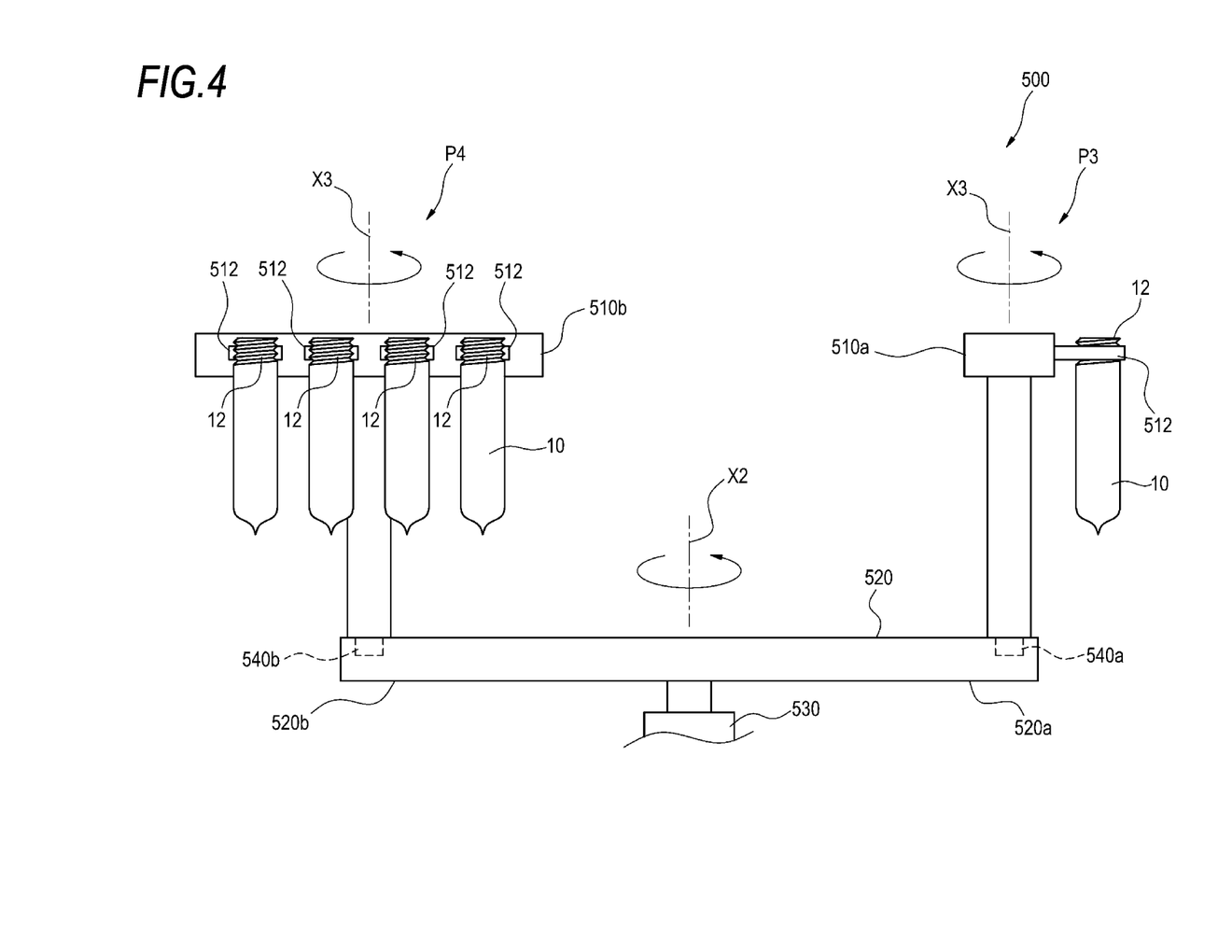
FIG. 4 is a view showing a transfer member.

In FIG. 4, the holding member 510a is disposed at a position (receiving position P3), where the holding member 510a can receive the preforms 10 that is located in the post-cooling position P2. The holding member 510b is disposed at a position (conveying position P4) that is opposite to the receiving position P3 and thus revolved from the receiving position P3 by 180° about the second central axis X2. The conveying position P4 is a position (delivering position) where the preforms 10 are to be delivered to the temperature adjustment station 200 along the conveying path A. The holding members 510a, 510b are movable between the receiving position P3 and the conveying position P4 by a moving mechanism (second rotary member 520) included in the transfer member 500, thereby changing positions thereof with each other. In addition, the post-cooling position P2 and the receiving position P3 may be arranged so as to overlap each other in a vertical direction (upward and downward direction) of the manufacturing device 1.

Further, each of the holding members 510a, 510b is configured to be intermittently rotated by 90° about a third central axis X3 (i.e., rotated about its own axis) by respective two second holding member switching mechanisms (e.g., electric motors 540a, 540b) included in the transfer member 500. The third central axis X3 extends through a connection portion on the respective end portions 520a, 520b of the second rotary member 520. When disposed at the receiving position P3, the holding members 510a, 510b are disposed in a direction allowing to receive the preforms 10 arranged along the arrangement direction C. When disposed at the conveying position P4, the holding members 510a, 510b are disposed in an orientation causing the preforms 10 to be aligned along a direction along which the conveying position A extends. In other words, while moving the holding members 510a, 510b, the respective second holding member switching mechanisms are configured to rotate the respective holding members 510a, 510b about their own axis to change an orientation of the plurality of preforms 10 aligned in the arrangement direction C to an orientation aligned along the conveying path A. That is, the holding members 510a, 510b are configured to rotate about their own axis when moving from the receiving position P3 to the conveying position P4 so as to change the orientation of the preforms 10 aligned in the arrangement direction C to the orientation aligned in the direction along which the conveying path A extends, and then configured to transfer the preforms 10 to the temperature adjustment station 200.

Herein, while the preforms 10 are changed in orientation by the transfer member 500 and thus moved from the injection molding station 100 to the temperature adjustment station 200, the preforms 10 is allowed to be cool in the air. That is, the manufacturing device 1 includes a cooling unit between the injection molding station 100 and the temperature adjustment station 200, and the changing unit 150 is provided in the cooling unit.

Next, the temperature adjustment station 200 will be described with reference to FIGS. 1 and 2. The temperature adjustment station 200 has a normal temperature adjustment unit 210 and a local temperature adjustment unit 220. The normal temperature adjustment unit 210 is configured to adjust the entire temperature of the preforms 10 to be suitable for blow molding by any temperature adjustment means, such as an infrared heater type, a RED type, an electromagnetic wave heating type and additional cooling using air or a temperature adjustment mold and a temperature adjustment pot mold. The local temperature adjustment unit 220 is configured to locally adjust the temperature of the preforms 10 by any temperature adjustment means, such as an infrared heater type, a RED type, an electromagnetic wave heating type, local cooling using air or the like. The local temperature adjustment unit 220 is disposed right in front of the blow molding station 300. On the other hand, the number of local temperature adjustment units 220 may be varied depending on the number of preforms 10 to be simultaneously conveyed during intermittent conveyance or the number of containers 20 to be simultaneously molded during blow molding. Although an aspect in which the preforms 10 and the containers 20 are intermittently conveyed one by one is described in the present embodiment, the number of local temperature adjustment units 220 may be changed as in FIGS. 1 and 2. In a case where a temperature adjustment mold is used as the normal temperature adjustment unit 210, a temperature of the mold is set to, for example, 40 to 100° C., preferably 50 to 70° C.

Next, the blow molding station 300 will be described. In this example, the blow molding station 300 includes a primary blow unit 310 and a final blow unit 320, thereby allowing the container 20 to be blow-molded in two steps. The primary blow unit 310 includes a primary blow mold constituted by, for example, a stretching rod, a blow core mold and a blow cavity mold. For example, the primary blow unit 310 is configured to introduce air into the preform 10 while stretching the preform 10 with the stretching rod, thereby allowing an intermediate molded product 15 to be molded. The final blow unit 320 includes a final blow mold constituted by, for example, a blow core mold and a blow cavity mold, and also includes a stretching rod as necessary. For example, the final blow unit 320 is configured to stretch the intermediate molded product 15 with air, thereby allowing a container 20 to be molded. The final blow unit 320 is configured to blow-mold the container 20 by introducing and circulating cooled air therethrough. Also, the blow molding station 300 includes a handle introduction mechanism 330 for introducing a handle 18 to be attached to the container 20 during final blowing. On the other hand, in order to perform a heat treatment on the intermediate molded product, the blow cavity mold of the primary blow unit 310 may be set to a temperature (e.g., 110 to 140° C.) higher than a temperature (e.g., 60 to 90° C.) of the blow cavity mold of the final blow unit 320.

Figure 5:
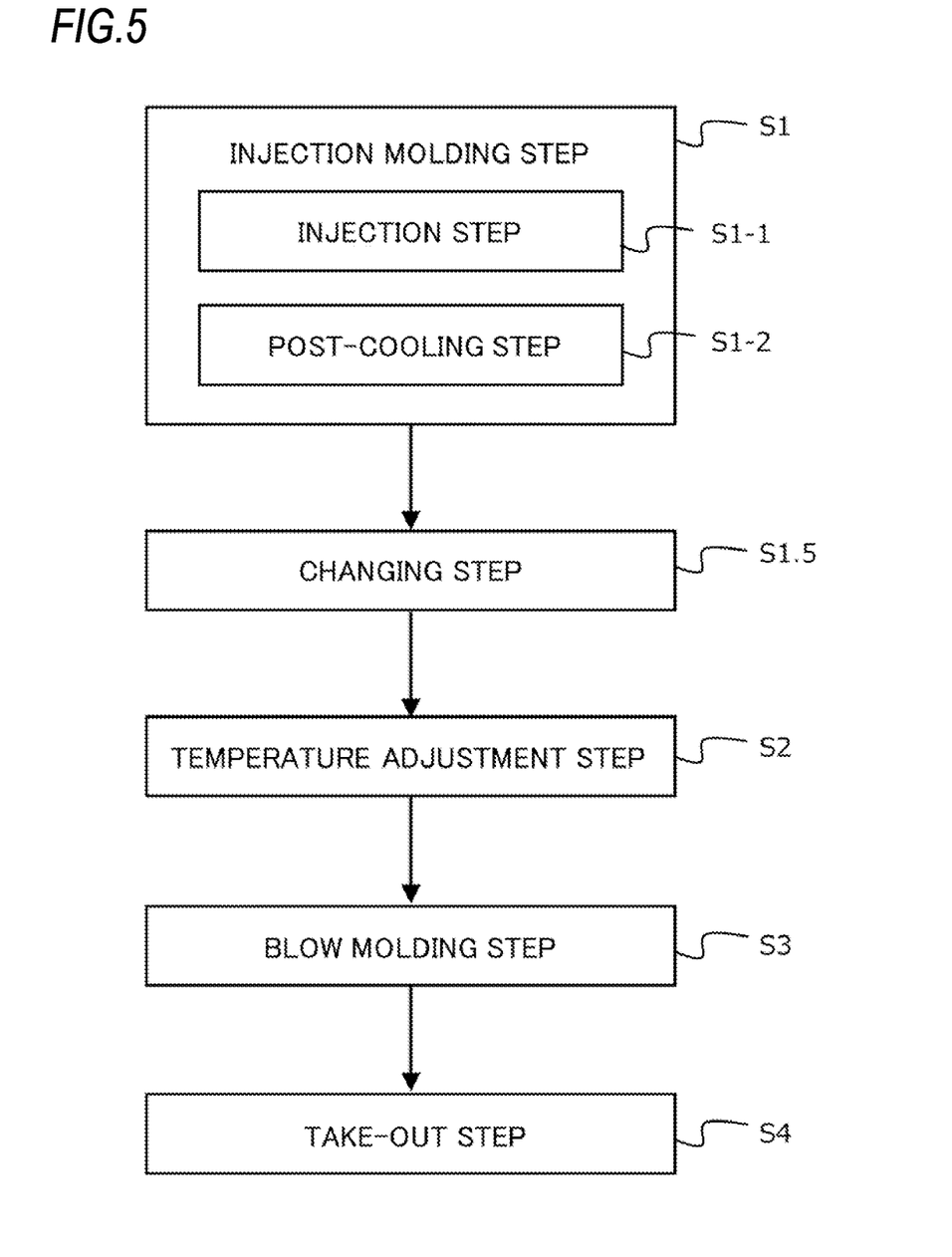
FIG. 5 is a flow chart of a process for manufacturing the container.

Next, the method for manufacturing a container 20 using the manufacturing device 1 will be described. FIG. 5 is a flow chart of a process for manufacturing the container 20. As shown in FIG. 5, the container 20 is manufactured through an injection molding step S1 of injection molding a plurality of preforms 10 along the arrangement direction C, a changing step S1.5 of changing an orientation of the plurality of preforms 10 aligned in the arrangement direction C to an orientation aligned along the conveying path A, a temperature adjustment step S2 of adjusting a temperature of the preforms 10, and a blow molding step of blow molding containers 20 from the preforms 20. Then, the containers 20 are taken out from the manufacturing device 1 through a take-out step S4.

The injection molding step S1 includes an injection step S1-1 and a post-cooling step S1-2. In the injection step S1-1, the injection device 102 injects a molten resin into an injection cavity defined by clamping the injection cavity mold 112, the injection core mold 122a (122b) and the injection neck mold 124a (124b), thereby molding the preforms 10. After a predetermined period of time has elapsed after injection, the preforms 10 are separated (released) from the injection cavity mold 112, and then the preforms 10 held by the injection core mold 122a (122b) and the injection neck mold 124a (124b) are moved from the injection position P1 to the post-cooling position P2 by rotating the first rotary member 130 by 180°.

Subsequently, in the post-cooling step S1-2, the preforms 10 which have been moved to the post-cooling position P2 while held by the injection core mold 122a (122b) and the injection neck mold 124a (124b) are cooled for a predetermined period of time. Cooling of the preforms 10 is performed from the inside thereof by the injection core mold 122a (122b) and the injection neck mold 124a (124b), in which a coolant, such as water, flows. After the preforms 10 have been moved to the post-cooling position P2, the cooling pod 140 is moved up to allow the preforms to be received in the cooling pod 140. Cooling of the preform 10 is also performed from the outside thereof by the cooling pod 140. Even while the preforms 10 are moved from the injection position P1 to the post-cooling position P2, the preforms 10 are cooled from the inside through the injection core mold 122a (122b). Therefore, such a movement time can also be regarded as a part of an initial stage of the post-cooling step S1-2.

Further, while the post-cooling step S1-2 of cooling the preforms 10 held by the injection core mold 122a (122b) and the injection neck mold 124a (124b) is performed at the post-cooling position P2, next injection step S1-1 is performed by another injection core mold 122b (122a) and injection neck mold 124b (124a) that are disposed at the injection position P1. That is, the next injection step S1-1 and post-cooling step S1-2 are simultaneously performed. After a predetermined period of time, the preforms 10 are separated from the injection core mold 122a (122b) and the injection neck mold 124a (124b) and thus kept received in the cooling pod 140. Subsequently, the cooling pod 140 is moved down to a height at which the transfer member 500 can receive the preform 10. Then, the first rotary member 130 is rotated again to perform the next injection step S1-1 and post-cooling step S1-2. By repeating this process, the injection molding step S1 is continuously performed.

In the subsequent changing step S1.5, the preforms 10 received in the cooling pod 140 and thus aligned in the arrangement direction C are held by the holding member 510a (510b) that is included in the transfer member 500 and that is disposed at the receiving position P3. Then, the cooling pod 140 is further moved down to allow the preforms 10 to be rotated by the second rotary member 520. Then, the preforms 10 are moved from the receiving position P3 to the conveying position P4 by rotating the second rotary member 520. Also, during this time, the holding member 510a (510b) is rotated about its own axis, so that the preforms 10 are arranged along a direction along which the conveying path A extends. Then, the preforms 10 are held by the conveying members 600a, 600b, and thus the preforms 10 are released from the holding member 510a (510b). Subsequently, at least one preform 10 is intermittently delivered from the changing unit 150 to the conveying path A while held by the conveying members 600a, 600b. Moreover, during the changing step S1.5, the preforms 10 are allowed to be cool in the air. Therefore, a process for equalizing a temperature of the preforms 10 is performed until the preforms 10 are transferred to the temperature adjustment station 200.

Further, while the preforms 10 are being delivered by the conveying members 600a, 600b, preforms 10 molded by next injection molding step S1 are held by the holding member 510b (510a). After delivering the preforms 10 from the conveying position P4 to the conveying path A has been completed, the preforms 10 molded in the next injection molding step S1 are moved from the receiving position P3 to the conveying position P4 by rotating the second rotary member 520. By repeating this process, the changing step S1.5 is continuously performed.

After the preforms 10 are transferred to the conveying path A, the preforms 10 are conveyed to the temperature adjustment station 200 by the conveying members 600a, 600b, and then the temperature adjustment step S2 is performed there. In the temperature adjustment step S2, the preforms 10 are sequentially conveyed to the normal temperature adjustment unit 210 and then the local temperature adjustment unit 220, so that the temperature of the preforms 10 is adjusted to a temperature suitable for the subsequent blow molding step S3. That is, the temperature adjustment step S2 includes a normal temperature adjustment step and a local temperature adjustment step. The local temperature adjustment step is performed just before blow molding. Also, in the temperature adjustment step S2, the preforms 10 are conveyed from the normal temperature adjustment unit 210 to the local temperature adjustment unit 220 by the conveying member 600c. At this time, a pitch between the preforms is changed from a narrow pitch during injection molding to a wide pitch during blow molding.

After the temperature adjustment step S2, the preforms 10 are conveyed to the blow molding station 300 by the conveying member 600d, and then the blow molding step S3 is performed there. In the blow molding step S3, the preforms 10 are blow-molded into an intermediate molded product 15 by the primary blow unit 310 (primary blowing step), and the intermediate molded product 15 is blow-molded into a container 20 by the final blow unit 320 (final blowing step). In the final blow unit 320, cooled air is introduced into the container 20 after the container 20 is blow-molded. By using the cooled air in the final blow unit 320, the container 20 can be rapidly cooled and thus the blow molding step S3 can be shortened. In this way, shortening of the cycle time can be achieved. Further, in the final blow unit 320, a handle 18 is introduced into the final blow mold by the handle introduction mechanism 330, and the handle 18 is attached to the container 20.

After the blow molding step S3, the container 20 is conveyed to the take-out station 400 by the conveying member 600d, and then the container 20 is taken out (take-out step S4). On the other hand, the conveying member 600d simultaneously holds the temperature adjusted preform 10, the intermediate molded article 15 and the container 20, and conveys the same to the downstream step. Specifically, the conveying member 600d conveys the intermediate molded product 15 from the primary blow unit 310 to the final blow unit 320 while conveying the preform 10 from the temperature adjustment station 200 to the primary blow unit 310. Through this process, the container 20 can be obtained.

However, in a hot parison type blow molding, it takes time to cool an injection-molded preform. This is a factor that lengthens the entire molding cycle. In particular, in a hot parison type blow molding device that uses a rotary table, the number of articles to be injection-molded and the number of articles to be blow-molded are the same. As a result, since an injection molding station becomes a rate-determining step, it is impossible to shorten the cycle of molding. Also, a space required to dispose an injection neck mold can be ensured only within a size smaller than a radius of the rotary table. If only a size which can be received into a transport container is allowed, the size is also limited and thus an amount of production cannot be increased. Further, in order to perform stretch-blowing, it is necessary to optimize a temperature of the preform. Therefore, it is necessary not to simply cool the preform, but to optimize a temperature of the preform in a short time.

According to the manufacturing method for the container 20 as described above, while the injection step S1-1 for next preforms 10 is performed, the preforms 10 and the containers 20 can be conveyed through the temperature adjustment step S2 and the blow molding step S3 along the conveying direction (conveying path A) intersecting the arrangement direction C along which the preforms are arranged during an injection molding step S1. Therefore, it is possible to simplify a conveying mechanism, to shorten a time required for conveying, and to adjust a temperature of the preforms such an extent that no influence on the cycle of molding occurs.

In addition, the changing step S1.5, in which the orientation of the preforms 10 aligned in the arrangement direction C are changed to an orientation aligned along the conveying direction (conveying path A), is performed between the injection molding step S1 and the temperature adjustment step S2. Therefore, it is possible to smoothly transfer the preforms 10 to the temperature adjustment step S2 and the blow molding step S3. In this way, it is possible to maintain or improve a quality of the containers 20 even under a short cycle time while enhancing an amount of production of the containers 20 per unit time. Further, during the changing step S1.5, moving of the preforms 10 and changing of orientation thereof can be simultaneously performed, thereby making it possible to deliver the preforms 10 efficiently while saving space.

Further, in the injection molding step S1 as described above, the preforms are injection-molded along the arrangement direction C intersecting the conveying direction (conveying path A) during the temperature adjustment step S2 and the blow molding step S3. In this way, an injection port of the injection device can be disposed at the center portion in a longitudinal direction of the cavity mold that is used in the injection molding step S1, so that the injection device itself can be disposed in a transverse direction of the cavity mold (i.e., an orientation along the conveying direction). Therefore, it is possible to reduce an occupied space required to manufacture the containers 20 relative to an amount of production thereof per unit time.

Also, according to the manufacturing method for the container 20 as described above, the injection molding step S1 includes the injection step S1-1 and the post-cooling step S1-2. Therefore, the preforms 10 can be released from the cavities in a relatively high temperature state in the injection step S1-1, and the preforms 10 can be continued to be cooled in the post-cooling step S1-2. Also, while the preforms 10 are continued to be cooled in the post-cooling step S1-2, an injection step S1-1 for next preforms 10 can be performed, thereby allowing the injection molding step S1 to be repeated in a short time. In this way, it is possible to maintain or improve a quality of the containers 20 even under a short cycle time while enhancing an amount of production of the containers 20 per unit time. Specifically, when a plurality of second injection molds 120a, 120b are in a stationary state, at least one of the plurality of second injection molds 120a, 120b is disposed at the injection position P1 at which the first injection mold 110 is disposed, and at least one of the plurality of second injection molds 120a, 120b is disposed at the post-cooling position P2 which is opposite to the injection position P1 with respect to the first central axis X1. Therefore, after the preforms 10 are molded at the injection position P1 of the injection molding station 100 (on the upstream side thereof), the preforms 10 are released from the injection cavity mold 112 of the first injection mold 110 in a state where cooling of the preforms 10 is not fully completed. Then, the preforms 10 held by the second injection molds 120a, 120b are revolved and moved to the post-cooling position P2 in the injection molding station 100 (to the downstream side thereof), and cooling of the preforms 10 is continued there. Also, while the preforms 10 are continued to be cooled at the post-cooling position P2, the next preforms 10 can be injection-molded, thereby allowing the injection molding to be repeated in a short time.

Also, in the changing step S1.5 as described above, the preforms 10 are allowed to be cooled in the air, thereby making it possible to further shorten a cooling time in the injection molding step S1. Therefore, the injection molding step S1 can be repeated in a short time, so that an amount of production of the containers 20 per unit time can be increased. In addition, unevenness in temperature of the preforms 10 can also be resolved in front of the temperature adjustment station 200 (i.e., the temperature thereof can be equalized), thereby allowing higher quality containers 20 to be manufactured.

Further, since the temperature adjustment step S2 includes the local temperature adjustment step, it is easy to blow-mold the containers 20 into a desired shape. Further, it is easy to blow-mold a special-shaped container, such as a large container including a handle. Further, by performing the local temperature adjustment step just before the blow molding step, the preforms can be blow-molded immediately after a temperature distribution optimized for blow molding is obtained therein.

Also, in the blow molding step S3, the preforms 20 are blow-molded in two steps through the primary blowing step and the secondary blowing step. That is, after intermediate molded products are first molded, containers are molded therefrom, thereby improving a thickness distribution in the containers finally obtained. In particular, when molding a special bottle (e.g., a large-sized bottle, such as a 5-gallon bottle made of PET material), a quality of the container can be maintained or improved. In addition, for the 5-gallon bottle, it is common to attach a handle to the container. By blowing the container in two stages, it is possible to select conditions suitable for attaching the handle, thereby improving the attaching strength. In addition, an improvement in heat resistance can also be expected.

As described above, according to the manufacturing device 1 and the manufacturing method of the present disclosure, it is possible to maintain or improve a quality of resin containers even under a short cycle time while enhancing an amount of production of the containers per unit time. Also, in a case of especially large-sized (e.g., 5-gallon) containers 20, it takes time to cool preforms 10. According to the manufacturing device 1 and the manufacturing method of the present disclosure, favorable effects can be obtained in manufacturing especially large-sized containers 20.

Also, the manufacturing device 1 of the foregoing embodiment includes temperature adjustment (heating or cooling) parts including the second injection mold 120a, 120b at the post-cooling position P2, the transfer member 500, the normal temperature adjustment unit 210 and the local temperature adjustment unit 420. Since a number of temperature adjustment parts is provided, the temperature distribution in the preforms 10 can be adjusted at a temperature suitable for blow molding even if the cycle time is short, thereby maintaining or improving the quality of the containers 20.

Further, in the manufacturing device 1 of the foregoing embodiment, the blow molding station 300 includes one or more final blow molds, and the number of preforms 10 and containers 20 corresponding to the number of final blow molds are intermittently conveyed through the conveying path A. According to the manufacturing device 1 having the above configuration, the preforms 10 and the containers 20 as many as the number which can be conveyed at a time are conveyed to the final blow molds 320, thereby taking a balance between a temperature adjustment time and a waiting time even while optimally setting the temperature distribution in the preforms 10. Therefore, it is possible to realize a further reduced cycle time and also to maintain or improve the quality of the containers 20.

On the other hand, in the present disclosure, conveying linearly does not mean only a case where the conveying path is strictly drawn by one straight line. Even a case where the conveyance is performed by a plurality of conveying paths inclined at slightly different angles, the effect of direction alignment by the transmission member can be obtained. In addition, according to the present disclosure, even if an orientation of a plurality of arranged preforms along a direction inclined by 30° to 150°, for example, with respect to the conveying path extending in a substantially straight line shape in the temperature adjustment station and the blow molding station is aligned by the transfer member, the effect of the present disclosure can be obtained. In addition, the term "orthogonal" does not mean only an angle of exactly 90° angle, but includes, for example, an angle of about 90°±5°.

Figure 6:
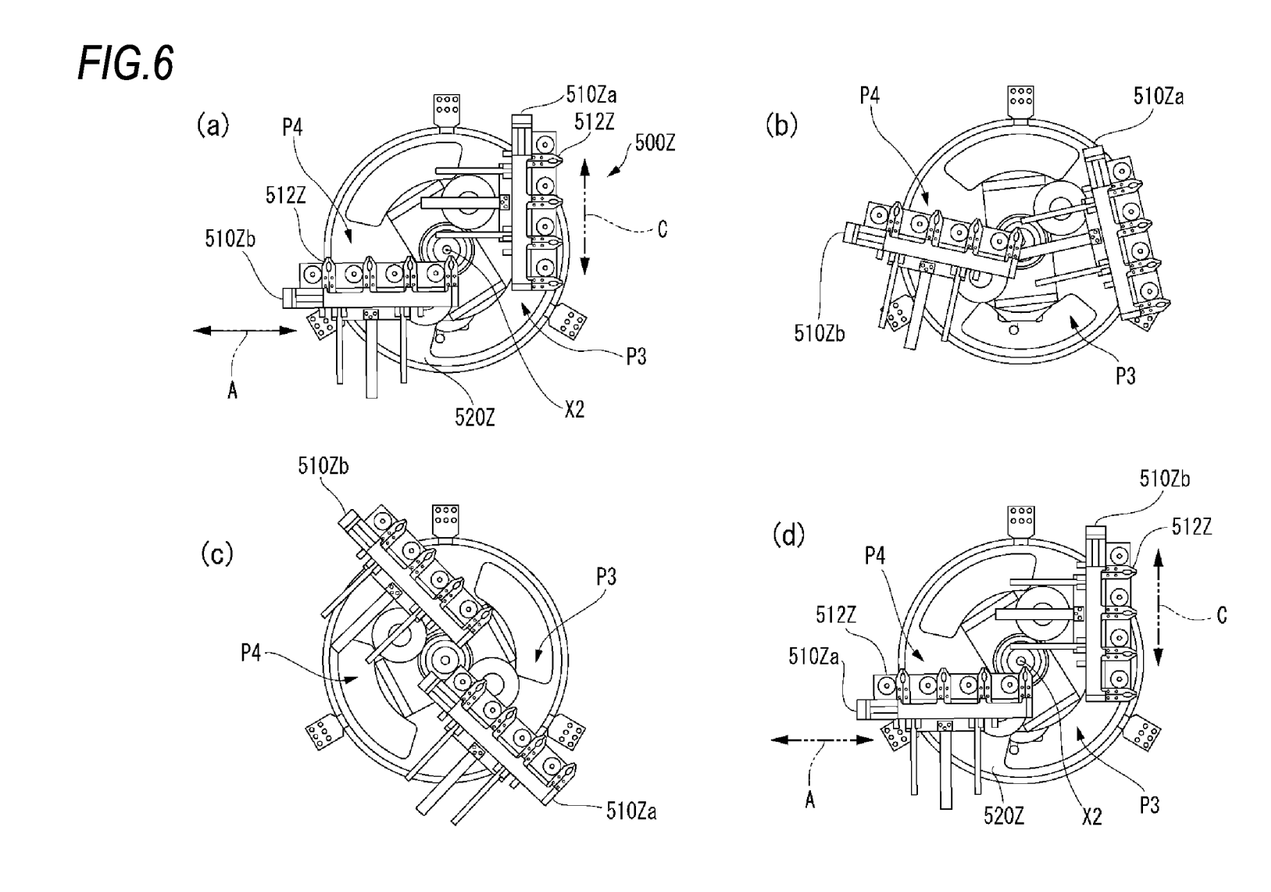
FIG. 6 is a view showing another example of the transfer member.

Here, another aspect of the transfer member 500 described in the foregoing embodiment will be described with reference to FIG. 6. FIG. 6 is a view showing operation of a transfer member 500Z, in which part (a) of FIG. 6 represents an initial state, part (b) of FIG. 6 represents a primary state, part (c) of FIG. 6 represents a secondary state, and part (d) of FIG. 6 represents a tertiary state. In the following, the transfer member 500Z will be described based on an aspect, in which the transfer member 500 of the manufacturing device 1 is replaced with the transmission member 500Z.

The transfer member 500Z includes holding members 510Za, 510Zb configured to hold preforms, a second rotary member 520Z (moving mechanism) having a generally circular disk shape and configured to be rotated about the second central axis X2 by, for example, an electric motor (not shown), and two holding member switching mechanisms (e.g., electric motors, not shown in FIG. 6) attached to the second rotary member 520 so as to correspond to the respective holding members 510Za, 510Zb. The second rotary member 520Z is configured to move the holding members 510Za, 510Zb from a receiving position P3 at which the holding members 510Za, 510Zb receives a plurality of preforms injection-molded by the injection molding station to a delivering position (conveying position P4) at which the preforms are to be delivered to the temperature adjustment station 200. The respective holding member switching mechanisms are configured to rotate the respective holding members 510Za, 510Zb about its own axis while moving the holding members 510Za, 510Zb to change an orientation of a plurality of preforms aligned in the arrangement direction C to an orientation aligned along the conveying direction (i.e., a direction along which the conveying path A extends).

Each of the holding members 510Za, 510Zb includes a plurality of holding portions 512Z (e.g., claws and hands) configured to grip and hold a neck portion of the preforms. The holding members 510Za, 510Zb are supported by the second rotary member 520 at positions revolved by 180° from each other about the second central axis X2 on the second rotary member 520. The second rotary member 520 is configured to intermittently rotate by 180° per one cycle of transferring, thereby changing the positions of the holding members 510a, 510b with each other.

Here, the operation of the transfer member 500Z will be described. In the initial state shown in part (a) of FIG. 6, the holding member 510Za is disposed at the receiving position P3, and the plurality of holding portions 512Z thereof are disposed to be aligned in an orientation along the arrangement direction C in the injection molding station. Also, in the initial state, the holding member 510Zb is disposed at the conveying position P4, and the plurality of holding portions 512Z thereof are disposed to be aligned in an orientation along the conveying path A.

Then, the transfer member 500Z transitions to the primary state shown in part (b) FIG. 6, and then transitions to the secondary state shown in part (c) FIG. 6. When the transition is made from the initial state to the primary state and further to the secondary state, the second rotary member 520Z rotates clockwise, so that the holding member 510Za and the holding member 510Zb change in position with each other. Further, when the transition is made from the initial state to the primary state and further to the secondary state, the holding member 510Za rotates counterclockwise about its own axis and the holding member 510Zb rotates clockwise about its own axis. Then, when the transition has been made to the tertiary state shown in part (c) of FIG. 6, the second rotary member 520Z has rotated by 180° and stops there. Further, when the transition has been made to the tertiary state, the holding member 510Za and the holding member 510Zb have revolved by 90° in directions reverse to each other and stop there. Also, in the tertiary state, the holding member 510Za is disposed at the conveying position P4, and the plurality of holding portions 512Z thereof are disposed to be aligned in the orientation along the conveying path A. In the tertiary state, the holding member 510Zb is disposed at the receiving position P3, and the plurality of holding portions 512Z thereof are disposed to be aligned in the orientation along the arrangement direction C in the injection molding station.

Subsequently, the holding member 510Za and the holding member 510Zb change in position with each other by operation reverse to the above operation proceeding from the tertiary state to the secondary state and then to the primary state. That is, the second rotary member 520Z rotates counterclockwise, the holding member 510Za rotates clockwise about its own axis, and the holding member 510Zb rotates counterclockwise about its own axis. In this way, the transfer member 500Z returns to the initial state. The operation as described above is repeated so that the holding member 510Za and the holding member 510Zb change in position with each other and preforms are transferred from the injection molding station to the temperature adjustment station. In addition, although an aspect, in which the second rotary member 520Z rotates by switching between clockwise and counterclockwise directions for each rotation of 180°, has been described above, an aspect, in which the rotation direction is fixed to the clockwise or counterclockwise direction and intermittent rotation of 180° is performed, may be conceived.

Here, one preform positioned at one end of a plurality of preforms along the arrangement direction C in the injection molding station is defined as a first preform 10a1, and one preform positioned at the other end is defined as a N1th preform 10aN1 (see FIG. 1), where N1 is an integer of 2 or more. When conveying the preforms in the conveying direction intersecting the arrangement direction C as in the manufacturing device 1, either of the first preform 10a1 and the Nth preform 10aN1 is always conveyed at the forefront. In FIG. 1, the preforms 10 located at the injection position P1 are aligned such that the first preform 10a1, . . . , the N1−1th preform, and the N1th preform 10aN1 are aligned in order from the bottom to the top on the paper surface. In addition, in FIG. 1, the preforms 10 positioned at the post-cooling position P2 are aligned such that the first preform 10a1, . . . , the N1−1th preform, and the N1th preform 10aN1 are aligned in order from the top to the bottom on the paper surface. In the injection molding station, the plurality of preforms may vary in temperature distribution to some extent depending on a mold (e.g., the temperature distribution of the preforms varies continually (normally) and regularly for each concave portion 114 of the first injection mold 110 or the like). If the order of arrangement of preforms is not kept consistent during conveying thereof, a temperature of a plurality of preforms may not be properly adjusted even when temperature conditions in temperature adjustment molds and the like of the temperature adjustment station 200 are adjusted in accordance with the order of arrangement.

In the transfer member 500Z as described above, when the holding members 510Za, 510Zb are moved from the receiving position P3 to the conveying position P4, the holding members 510Za, 510Zb rotate counterclockwise about their own axis to change an arranged orientation of the respective holding portions 512Z from the arrangement direction C to the conveying direction. When the holding members 510a, 510b are moved from the receiving position P3 to the conveying position P4, directions in which they are revolved and moved are different, but directions in which they rotate about their own axis are the same. That is, the transfer member 500Z is configured to cause an orientation of a plurality of preforms 10 aligned in the arrangement direction C to an orientation aligned along the conveying direction, in such a way that the first preform 10a1 (or the Nth preform 10aN1) is always at the forefront. Since the transfer member 500Z is provided, the preforms 10 can be conveyed to the temperature adjustment station 200 and the blow molding station 300 without changing the order of the preforms 10 when molded in the injection molding station. In this way, the preforms can always be conveyed to the next step in order from the first preform 10a1 to the Nth preform 10aN1. Therefore, it is possible to maintain or improve the quality of the containers 20 without being influenced by a variation in temperature state between the first preform 10a1 and the Nth preform 10aN1. On the other hand, the rotation direction of the holding members 510Za, 510Zb when moved from the receiving position P3 to the conveying position P4 is not limited to the counterclockwise direction, but the holding members 510Za, 510Zb may rotate clockwise about their own axis in accordance with aspects of conveyance.

Also, although, in the foregoing embodiment, the blow molding station includes the final blow molding station configured to blow-mold one container, the present disclosure is not limited thereto. The blow molding station may include a final blow molding unit configured to blow-mold N2 (N2 is an integer of 1 or more) containers per one time. Further, although an aspect in which the conveying mechanism intermittently conveys one preform and container has been described, the present disclosure is not limited thereto. The conveying mechanism may be configured to convey a plurality of preforms and containers by one intermittent conveyance, or the number of articles to be conveyed by one intermittent conveyance may be changed in the temperature adjustment station or the blow molding station.

Further, if the blow molding station includes a final blow unit configured to blow-mold N2 (N2 is an integer of 1 or more, preferably 2 or more) containers per one time, the manufacturing device 1 may be configured such that N2 preforms and containers are intermittently conveyed in the blow molding station. At this time, if one preform positioned at one end of a plurality of preforms along the arrangement direction in the injection molding station is defined as the first preform and one preform positioned at the other end is defined as the N1th (N1 is an integer of 2 or more) preform, N1 and N2 have a relationship of N1>N2. That is, in the manufacturing method for a resin container according to the foregoing embodiment, the number of blow-molded containers (N2) per one time is smaller than the number (N1) of injection-molded preforms per one time. For example, the numbers of preforms and containers to be molded may be set such that a ratio of the number of containers to the number of preforms is 1 to 4, 2 to 4, or 2 to 6. N1 and N2 are changed by conveying the preforms and the containers through the temperature adjustment station and the blow molding station along the conveying direction intersecting the arrangement direction of the preforms in the injection molding station. Since the number of containers to be molded in the blow molding step is small, the number of blow molding molds is reduced and thus space saving of the manufacturing device can be realized. Further, if the container 20 is not required to have heat resistance (e.g., a container for a bag in box), it is not necessary to perform double blow molding. Therefore, the primary blow unit 310 may be eliminated, and also the final blow unit 320 may be provided instead of the primary blow unit 310. That is, the manufacturing device 1 can easily change the configuration of the blow molding station 300 and can perform double blow molding or one blow molding depending on specifications of the containers 20. Since the manufacturing device 1 can perform a multi-stage temperature adjustment process which includes post-cooling, air cooling, normal temperature adjustment and local temperature adjustment, the manufacturing device 1 can appropriately cope with the temperature adjustment of the preforms.

Meanwhile, the present invention is not limited to the foregoing embodiments, and thus appropriate changes, modifications and the like may be freely made thereto. In addition, the material, shape, dimension, numerical value, form, number, arrangement location and the like of each component of the foregoing embodiments are arbitrary and not limited, as long as the present invention can be achieved.

This application is based on Japanese Patent Application No. 2018-158912 filed on Aug. 28, 2018, the entire contents of which are incorporated herein by reference. Also, all references cited herein are incorporated in their entirety.

REFERENCE SIGNS LIST

1: Manufacturing device
10: Preform
20: Container
100: Injection molding station
110: First injection mold
112: Injection cavity mold
120a, 120b: Second injection mold
122a, 122b: Injection core mold
124a, 124b: Injection neck mold
140: Cooling pod
150: Changing unit
200: Temperature adjustment station
210: Normal temperature adjustment unit
220: Local temperature adjustment unit
300: Blow molding station
310: Primary blow unit
320: Final blow unit
400: Take-out station
500: Transfer member
510a, 510b: Holding member
X1: First central axis
X2: Second central axis
A: Conveying path
C: Arrangement direction
P1: Injection position
P2: Post-cooling position
P3: Receiving position P4: Conveying position
S1: Injection molding step
S1.5: Changing step
S2: Temperature adjustment step
S3: Blow molding step

The invention claimed is:

1. A method for manufacturing a resin container, comprising:
injection-molding a plurality of preforms along a predetermined arrangement direction;
adjusting a temperature of the preforms;
molding resin containers from the preforms;
after the injection molding, conveying the preforms and the containers through the temperature adjustment and the blow molding along a conveying direction intersecting the arrangement direction; and
between the injection molding and the temperature adjustment, changing an orientation of the preforms aligned in the arrangement direction to an orientation aligned along the conveying direction
wherein the changing of the orientation of the preforms comprises:
receiving the preforms injection-molded during the injection molding by a holding member positioned at a receiving position where the holding member receives the preforms;
moving the holding member from the receiving position to a delivering position where the preforms are to be delivered for the temperature adjustment;
while moving the holding member, rotating the holding member about an axis of the holding member to change the orientation of the preforms aligned in the arrangement direction to the orientation aligned along the conveying direction; and
delivering the preforms from the delivering position for the temperature adjustment,
the injection molding comprises: injecting a molten resin into cavities to mold the preforms; and cooling the preforms released from the cavities after the injecting,
during the injection molding, at least two injection molds are connected to a rotary member that is a rotary table, positioned on a circumference about a central axis, intermittently rotatable about the central axis, and configured to be movable between an injection position and a post-cooling position,
the injection molds include injection core molds and injection neck molds,
during the cooling, cooling of the preforms is performed from the inside of the preform by the injection core mold and the injection neck mold while the preforms are held by the injection core mold and the injection neck mold, and
during the cooling, the preforms are received in a cooling pod, and cooling of the preforms is performed from the outside of the preforms by the cooling pod.

2. The method for manufacturing the resin container according to claim 1,
wherein a preform positioned at one end of the preforms along the arrangement direction during the injection molding is defined as a first preform and a preform positioned at the other end of the preforms along the arrangement direction during the injection molding is defined as a N1th preform, N1 being an integer of 2 or more, and
wherein the changing of the orientation of the preforms comprises changing the orientation of the preforms aligned in the arrangement direction to the orientation aligned along the conveying direction in such a way that the first preform is at a forefront.

3. The method for manufacturing the resin container according to claim 1,
wherein the changing of the orientation of the preforms comprises allowing the preforms to be air cooled.

4. The method for manufacturing the resin container according to claim 1,
wherein the temperature adjustment comprises: adjusting a temperature of the preforms; and locally adjusting the temperature of the preforms.

5. A device for manufacturing a resin container, comprising:
an injection molding station configured to injection-mold a plurality of preforms along a predetermined arrangement direction;
a temperature adjustment station configured to adjust a temperature of the preforms;
a blow molding station configured to mold resin containers from the preforms;
a conveying mechanism configured to convey the preforms and the containers through the temperature adjustment station and the blow molding station along a conveying direction intersecting the arrangement direction; and
a changing mechanism provided between the injection molding station and the temperature adjustment station, the changing mechanism being configured to change an orientation of the preforms aligned in the arrangement direction to an orientation aligned along the conveying direction,
wherein the changing mechanism comprises:
a holding member configured to hold the preforms;
a moving mechanism configured to move the holding member from a receiving position where the holding member receives the preforms injection-molded in the injection molding station to a delivering position where the preforms are to be delivered to the temperature adjustment station; and
a holding member switching mechanism configured to rotate the holding member about an axis of the holding member to change the orientation of the preforms aligned in the arrangement direction to the orientation aligned along the conveying direction, while moving the holding member,
the injection molding station comprises: an injection unit configured to inject a molten resin into cavities to mold the preforms; and a post-cooling unit configured to cool the preforms released from the cavities after molded in the injection unit,
in the injection molding station, at least two injection molds are connected to a rotary member that is a rotary table, positioned on a circumference about a central axis, intermittently rotatable about the central axis, and configured to be movable between an injection position and a post-cooling position,
the injection molds include injection core molds and injection neck molds,
in the post-cooling unit, cooling of the preforms is performed from the inside of the preform by the injection core mold and the injection neck mold while the preforms are held by the injection core mold and the injection neck mold, and
in the post-cooling unit, the preforms are received in a cooling pod, and cooling of the preforms is performed from the outside of the preforms by the cooling pod.

6. The device for manufacturing the resin container according to claim 5,
wherein a preform positioned at one end of the preforms along the arrangement direction in the injection molding station is defined as a first preform and a preform positioned at the other end of the preforms along the arrangement direction in the injection molding station is defined as a N1th preform, N1 being an integer of 2 or more,
wherein the changing mechanism is configured to change the orientation of the preforms aligned in the arrangement direction to the orientation aligned along the conveying direction in such a way that the first preform is at a forefront.

7. The device for manufacturing the resin container according to claim 5, further comprising:
a cooling unit provided between the injection molding station and the temperature adjustment station and configured to allow the preforms to be air cooled in an air,
wherein the changing mechanism is provided in the cooling unit.

8. The device for manufacturing the resin container according to claim 5,
wherein the temperature adjustment station comprises: a normal temperature adjustment unit configured to adjust a temperature of the preforms; and a local temperature adjustment unit configured to locally adjust the temperature of the preforms.

9. A method for manufacturing a resin container, comprising:
injection-molding a plurality of preforms along a predetermined arrangement direction;
adjusting a temperature of the preforms;
molding resin containers from the preforms; and
after the injection molding, conveying the preforms and the containers through the temperature adjustment and the blow molding along a conveying direction intersecting the arrangement direction,
wherein the injection molding comprises: injecting a molten resin into cavities to mold the preforms; and cooling the preforms released from the cavities after the injecting, and
during the injection molding, at least two injection molds are connected to a rotary member that is a rotary table, positioned on a circumference about a central axis, intermittently rotatable about the central axis, and configured to be movable between an injection position and a post-cooling position.

10. A device for manufacturing a resin container, comprising:
an injection molding station configured to injection-mold a plurality of preforms along a predetermined arrangement direction;
a temperature adjustment station configured to adjust a temperature of the preforms;
a blow molding station configured to mold resin containers from the preforms; and
a conveying mechanism configured to convey the preforms and the containers through the temperature adjustment station and the blow molding station along a conveying direction intersecting the arrangement direction,
wherein the injection molding station comprises: an injection unit configured to inject a molten resin into cavities to mold the preforms; and a post-cooling unit configured to cool the preforms released from the cavities after molded in the injection unit, and
in the injection molding station, at least two injection molds are connected to a rotary member that is a rotary table, positioned on a circumference about a central axis, intermittently rotatable about the central axis, and configured to be movable between an injection position and a post-cooling position.

* * * * *